US010215419B2

(12) United States Patent
Strzepek et al.

(10) Patent No.: US 10,215,419 B2
(45) Date of Patent: Feb. 26, 2019

(54) PARTICULATE BUILDUP PREVENTION IN IGNITOR AND FUEL NOZZLE BOSSES

(71) Applicant: PRATT & WHITNEY CANADA CORP., Longueuil (CA)

(72) Inventors: Jakub Strzepek, Rzeszow (PL); Sri Sreekanth, Mississauga (CA); Kian McCaldon, Orangeville (CA); Honza Stastny, Georgetown (CA); Dan Titirica, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 402 days.

(21) Appl. No.: 15/205,822

(22) Filed: Jul. 8, 2016

(65) Prior Publication Data

US 2018/0010801 A1 Jan. 11, 2018

(51) Int. Cl.
F02C 7/20 (2006.01)
F23R 3/60 (2006.01)
F23R 3/28 (2006.01)

(52) U.S. Cl.
CPC ............... F23R 3/60 (2013.01); F23R 3/283 (2013.01); F23R 2900/00012 (2013.01)

(58) Field of Classification Search
CPC ... F23R 2900/00012; F23R 3/283; F23R 3/60
See application file for complete search history.

(56) References Cited

U.S. PATENT DOCUMENTS

| 3,311,148 | A | 3/1967 | Leitner | |
| 5,117,624 | A | 6/1992 | Roberts et al. | |
| 6,039,130 | A | 3/2000 | Pruet | |
| 6,976,363 | B2* | 12/2005 | McMasters | F23R 3/002 60/748 |
| 7,347,189 | B2 | 3/2008 | Anello et al. | |
| 7,543,383 | B2* | 6/2009 | Patel | B22F 3/22 29/890.14 |
| 7,775,051 | B2 | 8/2010 | Hernandez et al. | |
| 8,015,706 | B2 | 9/2011 | Markarian et al. | |
| 8,104,291 | B2 | 1/2012 | Myers et al. | |
| 8,375,726 | B2 | 2/2013 | Wiebe et al. | |
| 8,479,490 | B2 | 7/2013 | Zupanc et al. | |
| 9,249,978 | B2* | 2/2016 | Richardson | F23R 3/02 |
| 2015/0040568 | A1 | 2/2015 | Stastny et al. | |
| 2015/0211420 | A1* | 7/2015 | Sze | F02C 7/266 60/776 |
| 2016/0223193 | A1* | 8/2016 | Eastwood | F23R 3/14 |

* cited by examiner

Primary Examiner — Jesse Bogue
(74) Attorney, Agent, or Firm — Norton Rose Fulbright Canada LLP

(57) ABSTRACT

A floating collar assembly for a gas turbine engine combustor includes a ferrule having a peripheral wall and a recessed surface bounded by the peripheral wall, the recessed surface of the ferrule including a particulate collecting groove adjacent the peripheral wall, and a cap secured to the peripheral wall of the ferrule. The recessed surface of the ferrule, an interior surface of the cap and the peripheral wall of the ferrule define a cavity. A floating collar is disposed within the cavity and includes a peripheral flange inwardly spaced a distance from the peripheral wall of the ferrule.

20 Claims, 6 Drawing Sheets

PARTICULATE BUILDUP PREVENTION IN IGNITOR AND FUEL NOZZLE BOSSES

TECHNICAL FIELD

The disclosure relates generally to gas turbine engine combustors, and more particularly to floating collars for igniter and/or fuel nozzles of such combustors.

BACKGROUND

Gas turbine combustors are typically provided with floating collar or seal assemblies for mounting igniters or fuel nozzles to the combustor, in order to facilitate movement of igniters or fuel nozzles relative to the combustor shell and/or permit thermal growth differential therebetween during engine operation. The floating collar may also reduce loading on the igniter, fuel tubes and fuel nozzles mounted to the combustor thereby, which might otherwise be generated from vibration, thermally induced and stress induced combustor movement relative to the adjacent supporting structures.

Such floating collars may be retained within enclosed bosses mounted to the combustor. However, such enclosed bosses may be prone to obstruction by sand or other airborne particulate debris. Accordingly it is desirable to prevent particulate accumulation in spaces surrounding a floating collar.

SUMMARY

There is accordingly provided a floating collar assembly for a gas turbine engine combustor, the floating collar assembly comprising: a boss assembly including first and second portions assembled to provide a peripheral wall and spaced apart top and bottom walls collectively defining a cavity therebetween, the top and bottom walls each having a central opening therein aligned with one another, and at least one of the top and bottom walls including a recessed particulate collecting groove adjacent to the peripheral wall; and a floating collar within the boss assembly and having a peripheral flange received within the cavity and an opening extending axially therethrough aligned with the central openings of the top and bottom walls, a periphery of the peripheral flange proximate the particulate collecting groove being spaced inwardly from the peripheral wall of the boss assembly a selected distance, the selected distance chosen based on an expected size of particulate ingested into the floating collar assembly.

There is also provided a combustor for a gas turbine engine combustor having a floating collar assembly, the floating collar assembly comprising: a boss assembly including a ferrule and a cap secured together and cooperating to defined a cavity therewithin, the ferrule having a central axis, an opening extending axially therethrough, a peripheral wall and a recessed surface bounded by the peripheral wall, and the cap having an opening extending axially therethrough and a periphery secured to the peripheral wall of the ferrule, wherein the recessed surface of the ferrule, an interior surface of the cap and the peripheral wall of the ferrule define the cavity; and a floating collar trapped within the cavity of the boss assembly and having an opening extending axially therethrough in alignment with the openings of the ferrule and cap and a peripheral flange, the peripheral flange of the floating collar inwardly spaced a distance from the peripheral wall of the ferrule; wherein the recessed surface of the ferrule includes a particulate collecting groove adjacent the peripheral wall.

There is alternately provided a floating collar assembly for a gas turbine engine, the floating collar assembly comprising: a ferrule assembly having first and second halves assembled to provide spaced apart walls defining a cavity between them, the walls each having a central opening aligned with the other, at least one of the walls including one or more sand collecting grooves extending substantially around the respective central opening; and a floating collar having a peripheral flange received within the cavity and an opening extending axially therethrough aligned with said wall central openings, a periphery of the peripheral flange spaced inwardly from a peripheral wall of the ferrule assembly a sufficient distance to allow sand to pass between the periphery of the peripheral flange and the peripheral wall.

There is also alternately provided a floating collar assembly for a gas turbine engine combustor comprising: a ferrule having a central axis, an opening extending axially therethrough, a peripheral wall and a recessed surface bounded by the peripheral wall, the recessed surface of the ferrule including a particulate collecting groove adjacent the peripheral wall; a cap having an opening extending axially therethrough and being secured to the peripheral wall of the ferrule, whereby the recessed surface of the ferrule, an interior surface of the cap and the peripheral wall of the ferrule define a cavity; and a floating collar received within the cavity and having an opening extending axially therethrough and a peripheral flange inwardly spaced a distance from the peripheral wall of the ferrule.

There is further alternately provided a combustor for a gas turbine engine combustor having a floating collar assembly comprising: a ferrule having a central axis, an opening extending axially therethrough, a peripheral wall and a recessed surface bounded by the peripheral wall; a cap having an opening extending axially therethrough and being secured to the peripheral wall of the ferrule, whereby the recessed surface of the ferrule, an interior surface of the cap and the peripheral wall of the ferrule define a cavity; a floating collar having an opening extending axially therethrough and a peripheral flange inwardly spaced a distance from the peripheral wall of the ferrule, the flange disposed within the cavity; and wherein the recessed surface of the ferrule includes a particulate collecting groove adjacent the peripheral wall.

BRIEF DESCRIPTION OF THE DRAWINGS

Reference is now made to the accompanying Figures, in which.

DETAILED DESCRIPTION

Figure 1:
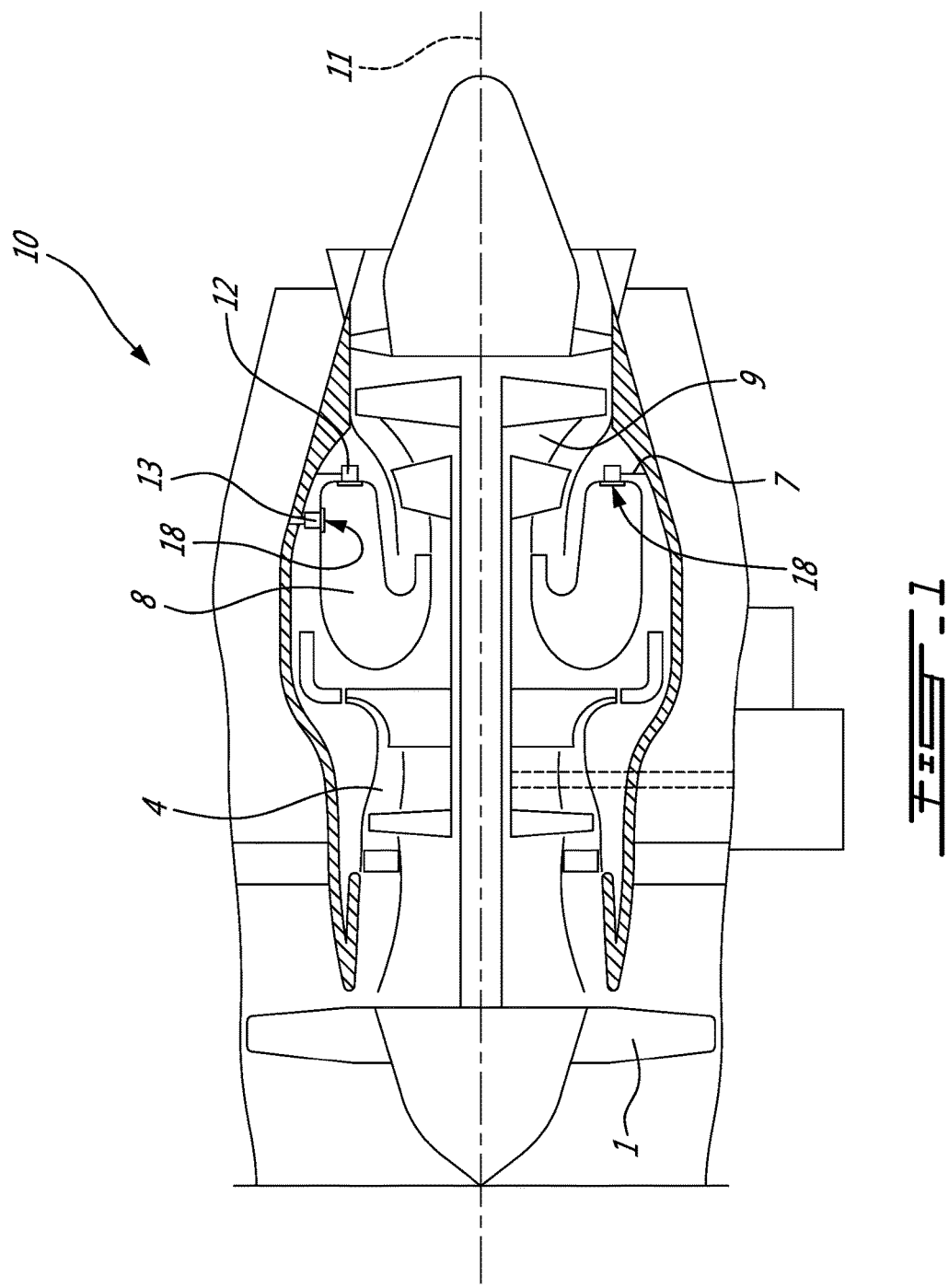
FIG. 1 is a schematic cross-sectional view of a gas turbine engine.

FIG. 1 illustrates a gas turbine engine 10 of a type preferably provided for use in subsonic flight, generally comprising in serial flow communication a fan 1 enclosed by a fan case 2 and through which ambient air is propelled, a multistage compressor 4 for pressurizing the air, a combustor 8 in which the compressed air is mixed with fuel and ignited for generating an annular stream of hot combustion gases, and a turbine section 9 for extracting energy from the combustion gases. Although a turbofan engine is depicted, it will be understood however that the gas turbine engine 10 as described herein may comprise other types of gas turbine engines such as turbo-shaft, turbo-prop and/or auxiliary power units. A longitudinal engine centerline 11 extends through the center of the engine 10, and at least the rotating components of the fan 1, the compressor section 4 and the turbine section 9 are concentric with and rotate about the engine centerline 11.

Referring still to FIG. 1, fuel is supplied to the combustor 8 through fuel tubes 7 and fuel is mixed with compressed air when sprayed through fuel nozzles 12 into the combustor 8 as a fuel air mixture that is ignited. Multiple fuel nozzles 12 and at least one igniter 13 are attached to and extend through the combustor liner into the combustion chamber within the combustor 8.

One or more of the fuel nozzles 12 and the igniter 13 may include a floating collar assembly 18 as described herein. The floating collar assembly 18 includes an at least partially enclosed boss assembly and provides particulate buildup prevention, as will be described in further below. The floating collar assembly 18 is applicable to fuel nozzles 12 which pass through the end combustor shell wall and to igniters 13 which pass through the outer combustor shell wall. In both cases, compressed air flows within a plenum surrounding the combustor and passes over the floating collar assemblies 18 that engage the fuel nozzles 12 and igniter 13. The air flow may contain sand and/or other airborne particulate material (herein, simply referred to as "particulate" material) that may become trapped and accumulate within the floating collar assembly. The floating collar assembly 18 as described herein therefore seeks to prevent or reduce the build up of such particulate material therewith, and limit any possible reduction in the efficacy of the floating collar.

As seen in FIG. 1, the igniter 13 may mounted with a mounting flange to the plenum wall and extends through the three part floating collar assembly 18 described below into an opening defined in the combustor wall which is part of the combustor 8 of FIG. 1.

Figure 5:
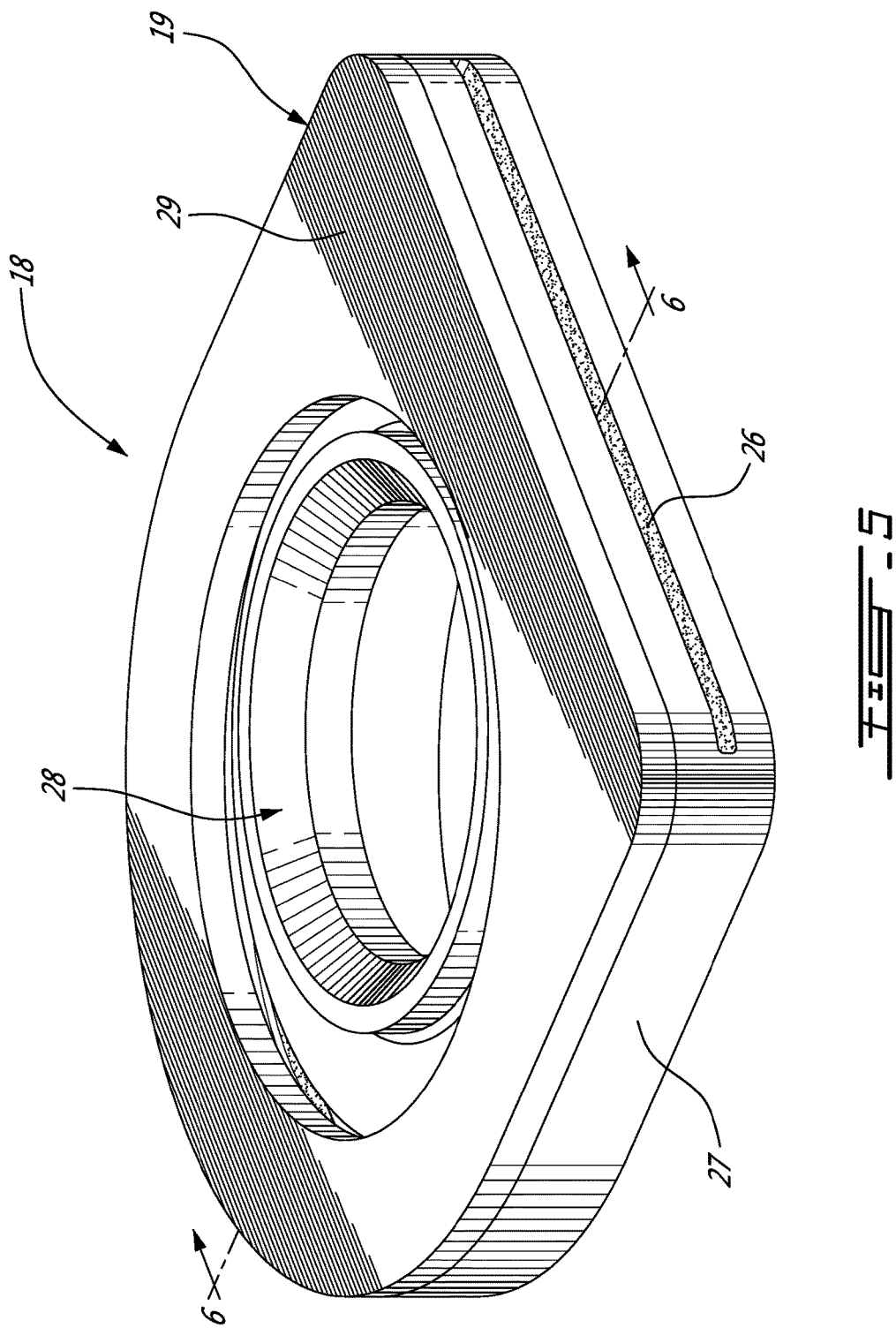
FIG. 5 is a perspective view of the floating collar assembly, having a boss assembly including the ferrule of FIGS. 2-3 and a cap assembled therewith, and the floating collar of FIG. 4 disposed within the boss assembly.

Referring first to FIG. 5, the floating collar assembly 18 includes generally a boss assembly 19 and a floating collar 28 trapped within the boss assembly. The boss assembly 19 includes at least first and second portions 27 and 29, which in the depicted embodiment comprise a ferrule 27 and a cap 29 secured thereto. The floating collar assembly 18 can be applied to both ignitors 13 and fuel nozzles 12.

Figure 2:
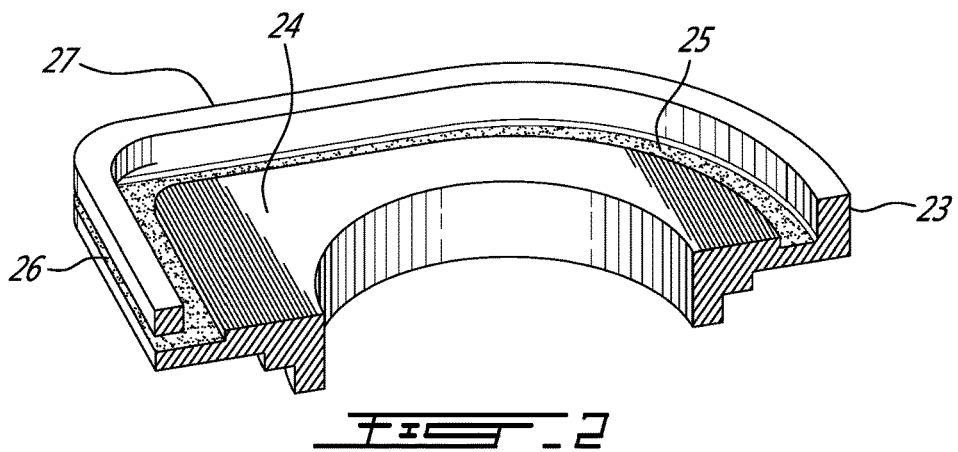
FIG. 2 is sectional isometric view of a ferrule of a floating collar assembly having a particulate collecting groove adjacent the peripheral wall and a particulate ejection slot in a downstream end.
Figure 3:
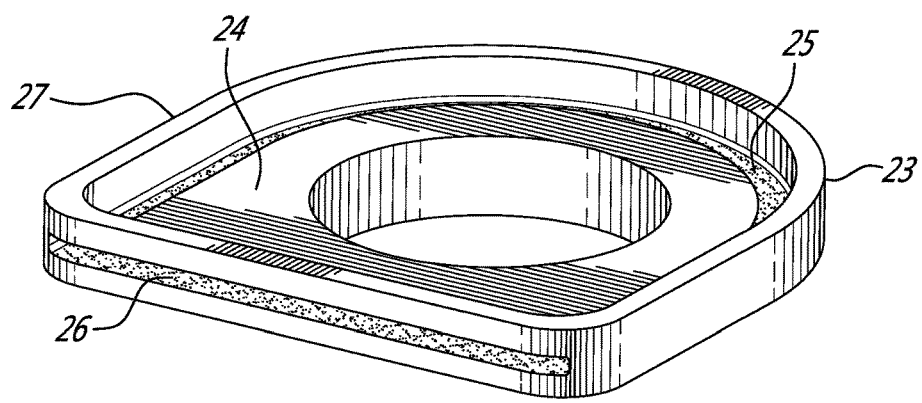
FIG. 3 is a perspective view of the ferrule of FIG. 2, showing the complete particulate collecting groove and the particulate ejection slot.
Figure 4:
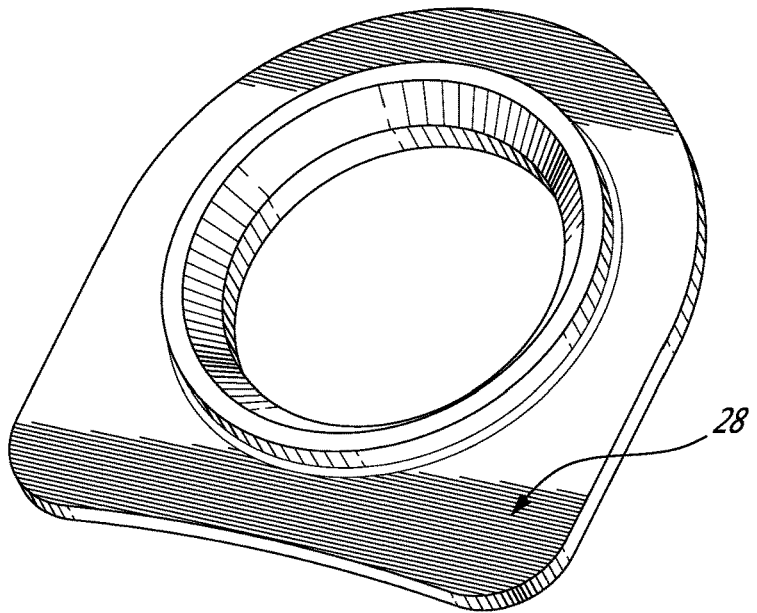
FIG. 4 is a perspective view of the floating collar used with the ferrule of FIGS. 2-3.

Referring now back to FIGS. 2 to 4, the ferrule 27 of the boss assembly 19 and the floating collar 28 are shown in isolation. More particularly, the ferrule 27 of the boss assembly 19 is shown in FIGS. 2-3. The other portion of the boss assembly 19, namely the cap 29, is secured to the ferrule 27 of the boss assembly 19 as can be seen in FIG. 5. The floating collar 28 is shown in FIG. 4.

Referring to FIG. 4, the floating collar 28 has a central collar that slides on the outer surface of the igniter 13 and an outer flange 20 that is contained within a space defined by the peripheral walls of the ferrule 27, the recessed surface 24 of the ferrule 27 bounded by the peripheral walls 23 and the inner surface of the cap 29. While providing an air flow seal, relative movement between the igniter 13 and the combustor wall are accommodated by axial sliding of the floating collar 28 on the igniter 13, and by lateral sliding of the flange 20 within the space defined by the peripheral walls 23 of the ferrule 27, the recessed outer surface 24 of the ferrule 27 and the inner surface of the cap 29.

Figure 6:
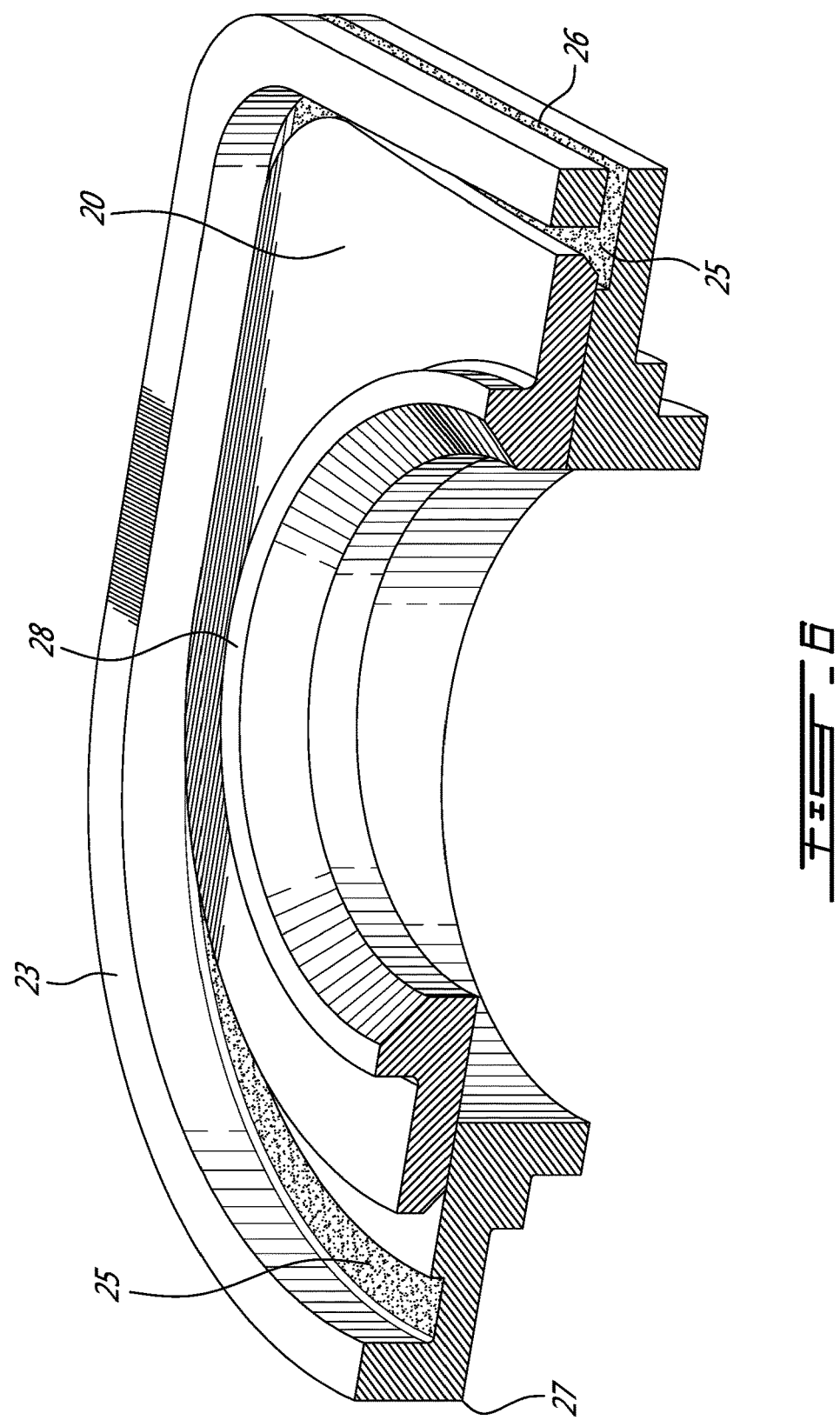
FIG. 6 is a cross-sectional perspective view of the floating collar assembly taken along line 6-6 of FIG. 5, with the cap removed to illustrate the particulate collecting groove and particulate ejection slot.
Figure 7:
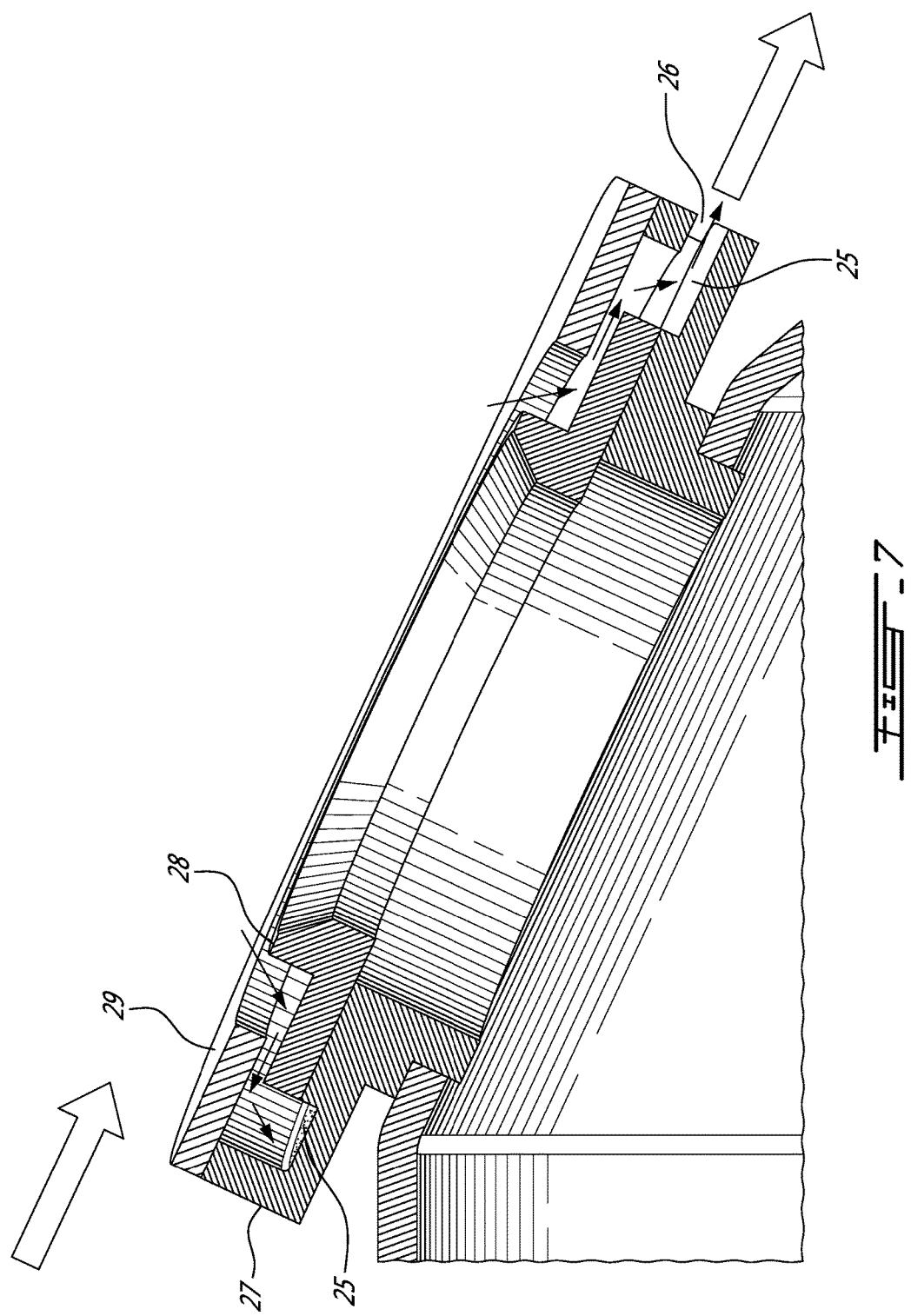
FIG. 7 is a cross-sectional view of the following collar assembly of FIG. 5 with the cap in place, showing the containment of the floating collar, the particulate collecting groove and particulate ejection slot.
Figure 8:
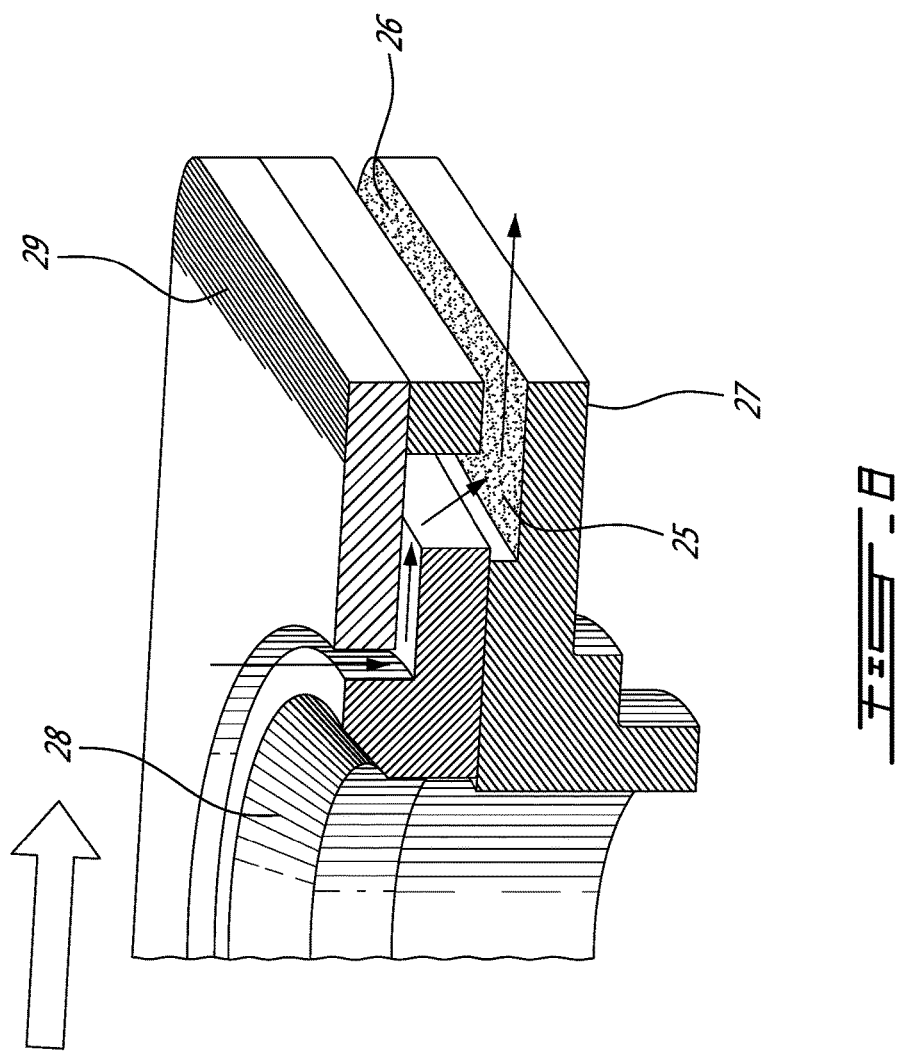
FIG. 8 is a partial detail sectional isometric view of the floating collar assembly of FIG. 7, showing the particulate collecting groove and particulate ejection slot in the downstream end of the ferrule.

The floating collar assembly has a shape chosen for preventing rotation with a circular upstream half to reduce air flow resistance and a square downstream half with rounded corners to prevent rotation of the floating collar 28. As shown in FIGS. 6-8 the gap 21 surrounding the outer edges of the flange 20 inward of the peripheral wall 23 allows the floating collar 20 to move laterally a limited distance.

The sealing between the igniter 13 and combustor wall is imperfect and leakage gaps exist all around the flange 20 of the floating collar 28 shown with arrows in FIGS. 7-8. To permit lateral movement of the floating collar 28 with minimal frictional resistance, the thickness dimension of the flange 20 must be less than the height dimension of the space defined between the cap 29 and the recessed surface 24 of the ferrule 27.

Since the air flow can carry sand and other airborne particulate, the air flow through gaps in the floating collar assembly can result in trapping and accumulation particles which then block the lateral movement of the floating collar 28 and defeat the purpose of the floating collar assembly. Particulate accumulation can also lead to surface abrasion, friction and wear.

Referring to FIGS. 5-8, the assembled ferrule 27, floating collar 28 and cap 29 are shown. The recessed surface 24 of the ferrule 27 bounded by the peripheral wall 23 includes a particulate collecting groove 25 and a particulate ejection port 26 in a downstream end of the ferrule 27. Air flow direction through the plenum upstream to downstream is indicated with large arrows in FIGS. 7-8. Leakage air flow through the floating collar assembly which carries particulate into the groove 25 is indicated with thin arrows in FIGS. 7-8.

Particulates carried by the air flow are directed through gravity and air flow into the groove 25. Lateral movement of the floating collar 28 towards the groove 25 also pushes the particulates into the groove 25. The outer edge of the floating collar 28 is shown chamfered at a 45 degree angle to aid in pushing particulates to the groove and to prevent particles from wedging between the floating collar 28 and the ferrule 27.

The particulate collecting groove 25 at a downstream end communicates with the particulate ejection port 26. Compressed air flow through the floating collar assembly follows a tortuous leakage path (shown in thin arrows in FIGS. 7-8)

passing over the floating collar 28, through the groove 25 and out the particulate ejection port 26 taking particles with it.

The particulate collecting groove 25 is shown in the drawings encircling the ferrule 27 inward of the peripheral wall 23. However the groove 25 could be limited to the downstream half of the ferrule 27. The outer edge of the floating collar 28 is shown chamfered but could be tapered, stepped or rounded to similar effect. The remaining portions of the flange 20 of the floating collar 28 have a uniform thickness.

The ferrule 27, cap 29 and floating collar 28 have a rectangular downstream end to prevent rotation of the floating collar 28 and a half circular shaped upstream end as illustrated, however any alternative shape that would prevent rotation is equally applicable. The groove 25 is shown with a rectangular cross sectional profile and has a continuous or common bottom surface with the particulate ejection port 26 for ease of manufacture and effective clearing of particles ejected out of the groove 25.

Although the above description relates to a specific preferred embodiment as presently contemplated, it will be understood that the embodiment includes mechanical and functional equivalents of the elements described herein.

The invention claimed is:

1. A floating collar assembly for a gas turbine engine combustor, the floating collar assembly comprising:
    a boss assembly including first and second portions assembled to provide a peripheral wall and spaced apart top and bottom walls collectively defining a cavity therebetween, the top and bottom walls each having a central opening therein aligned with one another, and at least one of the top and bottom walls including a recessed particulate collecting groove adjacent to the peripheral wall; and
        a floating collar within the boss assembly and having a peripheral flange received within the cavity and an opening extending axially therethrough aligned with the central openings of the top and bottom walls, a periphery of the peripheral flange proximate the particulate collecting groove being spaced inwardly from the peripheral wall of the boss assembly a selected distance, the selected distance chosen based on an expected size of particulate ingested into the floating collar assembly.

2. The floating collar assembly according to claim 1, wherein the groove extends adjacent at least a downstream half of the peripheral wall.

3. The floating collar assembly according to claim 2, wherein the groove extends adjacent the upstream half of the peripheral wall.

4. The floating collar assembly according to claim 1, wherein a downstream portion of the peripheral wall includes a particulate ejection port in flow communication with the particulate collection groove.

5. The floating collar assembly according to claim 4, wherein the particulate ejection port comprises an elongate slot extending across a width of the recessed surface of the at least one of the top and bottom walls of the boss assembly.

6. The floating collar according to claim 1, wherein the peripheral flange of the floating collar has a uniform thickness except for at least one outer edge adjacent the peripheral wall of the boss assembly, wherein the outer edge is one of: tapered; chamfered; stepped; and rounded.

7. The floating collar assembly according to claim 1, wherein the boss assembly and the floating collar have a rectangular shaped downstream end.

8. The floating collar assembly according to claim 7, wherein the boss assembly and the floating collar have a half circular shaped upstream end.

9. The floating collar assembly according to claim 1, wherein the particulate collecting groove has a rectangular cross-sectional profile.

10. The floating collar assembly according to claim 9, wherein the particulate ejection port and the particulate collecting groove have a common bottom surface.

11. The floating collar assembly according to claim 1, wherein the first and second portions of the boss assembly include a ferrule and a cap, the ferrule comprising the peripheral wall and the cap being secured thereto.

12. A combustor for a gas turbine engine combustor having a floating collar assembly, the floating collar assembly comprising:
    a boss assembly including a ferrule and a cap secured together and cooperating to defined a cavity therewithin, the ferrule having a central axis, an opening extending axially therethrough, a peripheral wall and a recessed surface bounded by the peripheral wall, and the cap having an opening extending axially therethrough and a periphery secured to the peripheral wall of the ferrule, wherein the recessed surface of the ferrule, an interior surface of the cap and the peripheral wall of the ferrule define the cavity; and
    a floating collar trapped within the cavity of the boss assembly and having an opening extending axially therethrough in alignment with the openings of the ferrule and cap and a peripheral flange, the peripheral flange of the floating collar inwardly spaced a distance from the peripheral wall of the ferrule;
    wherein the recessed surface of the ferrule includes a particulate collecting groove adjacent the peripheral wall.

13. The combustor according to claim 12, wherein the groove extends adjacent at least a downstream half of the peripheral wall.

14. The combustor according to claim 13, wherein the groove extends adjacent the upstream half of the peripheral wall.

15. The combustor according to claim 12, wherein a downstream portion of the peripheral wall of the ferrule includes a particulate ejection port in flow communication with the particulate collection groove.

16. The combustor according to claim 15, wherein the particulate ejection port comprises an elongate slot extending across a width of the recessed surface of the ferrule.

17. The combustor to claim 12, wherein the peripheral flange of the floating collar has a uniform thickness except for an outer edge adjacent the ferrule, wherein the outer edge is one of: tapered; chamfered; stepped; and rounded.

18. The combustor according to claim 12, wherein the ferrule, cap and floating collar have a rectangular shaped downstream end and a semi-circular upstream end.

19. The combustor according to claim 12, wherein the particulate collecting groove has a rectangular cross-sectional profile.

20. The combustor according to claim 19, wherein the particulate ejection port and the particulate collecting groove have a common bottom surface.

* * * * *